March 21, 1939. J. JENSEN 2,151,032
JOINT AND METHOD OF MAKING SAME
Filed June 21, 1937
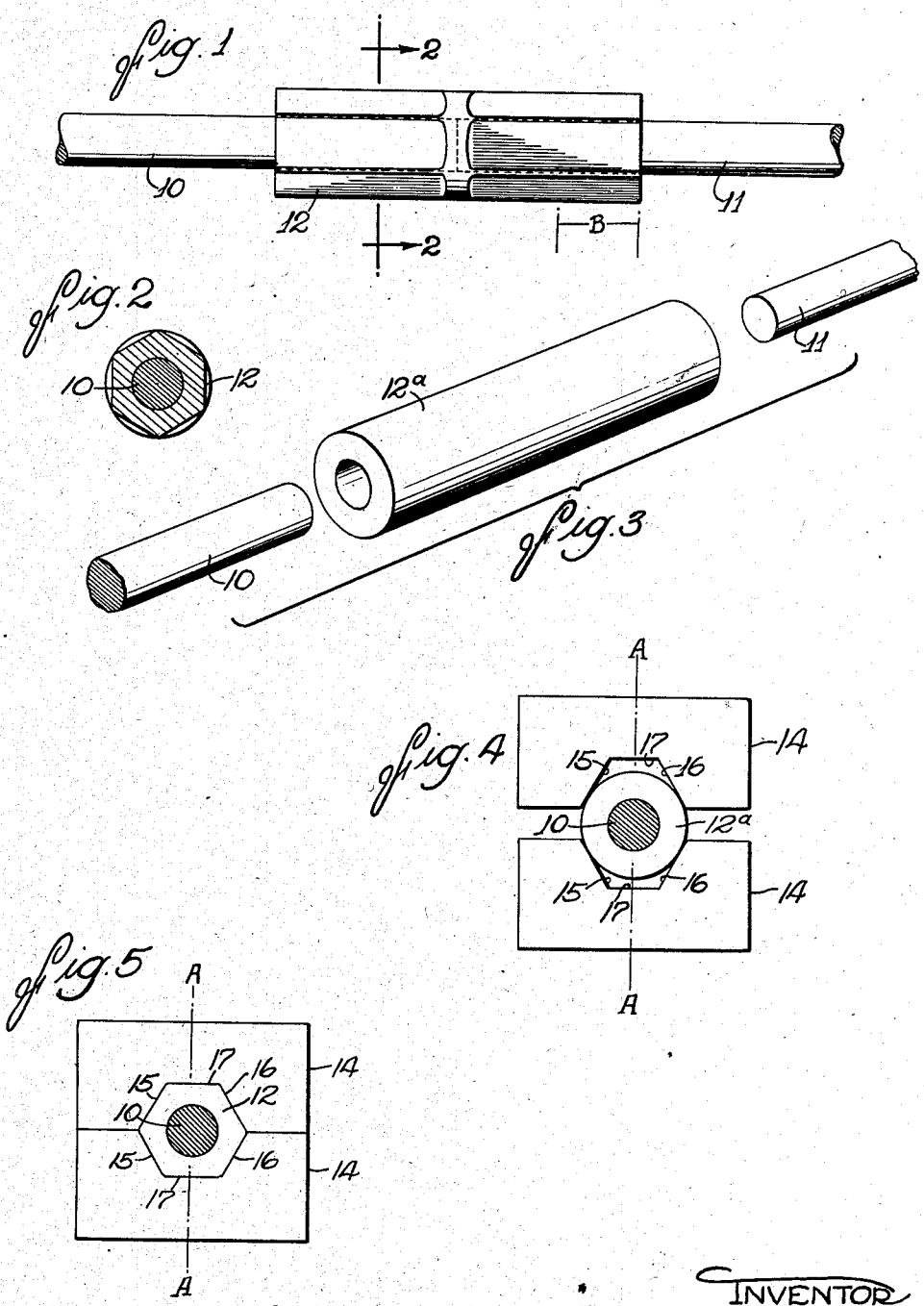
INVENTOR
John Jensen
ATTORNEYS Patented Mar. 21, 1939

2,151,032

UNITED STATES PATENT OFFICE 2,151,032

JOINT AND METHOD OF MAKING SAME

John Jensen, Rockford, Ill., assignor to Whitney Metal Tool Company, Rockford, Ill., a corporation of Illinois Application June 21, 1937, Serial No. 149,414

7 Claims. (Cl. 29—148)

The invention relates to joints used, for example, in splicing wires and the like and to a method of making the same.

In splicing wires used as electrical conductors in telephone or telegraph systems it has heretofore been proposed to effect the splice by compressing a tubular metal sleeve about the adjacent ends of the wires. Difficulties have been encountered, however, in the practical application of such joints. Thus, even though the sleeve be clamped tightly enough to withstand the necessary mechanical pulling strain when first installed, the joint subsequently becomes weakened by corrosion resulting from the entrance of moisture, smoke and other foreign matter into small crevices between the connecter sleeve and wires. This corrosion not only weakens the joint but also materially weakens its electrical conductivity. Although particular reference has been had to the splicing of wires, the invention herein contemplated is applicable to other forms of joints not only for wires but also for rods, bars, drawn metal tubes, pipes, and the like, and the term "rod-like members" used herein refers to all such devices.

The general object of the present invention is to provide an improved joint and method of forming the same for rod-like members in which a tubular sleeve is telescoped over a portion of the rod-like member and compressed into such intimate contact with the entire periphery of the rod-like member that the joint is impervious to moisture and gases.

A more specific object of the invention is to provide an improved joint and method of forming the same for rod-like members in which an initially cylindrical sleeve is compressed about an inserted portion of a rod-like member by deforming the sleeve into a polygonal cross-sectional shape to thereby form a tight joint with the inner walls of the sleeve in intimate contact with the entire periphery of the inserted member.

Further objects and advantages of the invention will become apparent as the following description proceeds and the features of novelty which characterize the invention are pointed out with particularity in the claims annexed to and forming a part of this specification.

For a better understanding of the invention, reference may be had to the accompanying drawing in which Figure 1 illustrates a completed spliced joint for a pair of wires embodying the invention.

Fig. 2 is a transverse sectional view along the line 2—2 in Fig. 1.

Fig. 3 is an exploded perspective view illustrating the wire ends and joint sleeve prior to the assembly thereof.

Figs. 4 and 5 are transverse sectional views of the joint parts positioned in a pair of clamping dies, at the beginning and at the end respectively, of the clamping operation.

For purposes of illustration the invention has been shown and described herein as applied to the splicing of wires but it will be understood that this application of the invention is simply exemplary and that the appended claims are intended to cover all modifications or variations within the spirit and scope of the invention.

Upon reference to Figs. 1 and 2, it will be seen that a pair of rod-like members has been illustrated in the form of wires 10 and 11, these wires being spliced together by a ductile metal sleeve 12 telescoped over their adjacent end portions and firmly clamped thereon. It has been found that a wide variety of metals may be used in forming joints of the type herein contemplated; that is, the rod-like members and sleeves may be made of steel, copper, aluminum or other structural metals which the particular installation requires.

In forming the joint in accordance with the present invention, a tubular sleeve blank is used which preferably has a cylindrical cross section such as the sleeve blank 12ª in Fig. 3. The interior diameter of the sleeve blank is preferably only slightly greater than the exterior diameter of the members inserted therein, a clearance of only about a thousandth of an inch being allowed. The ends of the wires 10 and 11 which are inserted in the sleeve blank 12ª are arranged in abutting relation (Fig. 1) with approximately equal portions of the sleeve blank telescoping over each of the wires.

In compressing the sleeve blank 12ª about the wires 10 and 11, it is pressed or crushed in such manner as to effect an internal flow of metal in the sleeve that will cause its inner wall to be displaced into intimate contact about the entire peripheries of the inserted wires. For this purpose, the sleeve is preferably deformed from an initial cylindrical shape into a generally polygonal cross-sectional shape. It has been found that the polygon thus formed should have a relatively small number of faces since if a large number is used, the dies act in substantially the same manner as half round dies. Such half round dies give defective results in that they cause a slight ovaling of the sleeve transversely of the direction of movement of the dies. This ovaling results in the formation of small crevices at the apexes of the oval in which corrosion subsequently takes place and furthermore, the joint is lacking in mechanical strength as compared to joints formed in accordance with the present invention. Also, it is preferable that the final polygonal cross section of the joint have an even number of faces since the formation of the dies without undercuts is thus facilitated. In general, it has been found that best results are had when an initially cylindrical blank is deformed into a hexagonal cross-sectional shape.

A pair of mating compression dies 14 (Figs. 4 and 5) have been illustrated for performing the shaping operations on the sleeve blank. It will be seen that these dies are provided with complementary recesses in their opposed faces which are adapted to deform the sleeve blank into a hexagonal cross-sectional shape. The maximum width of the hexagonal recess in the dies is preferably substantially equal to the initial diameter of the sleeve blank. When such a dimensional relation is utilized it will be seen upon reference to Fig. 4 that, as the dies first engage the sleeve blank, the side faces 15 and 16 contact the sleeve before the bottom faces 17. Thus, compressive forces are applied to the sleeve at spaced points on opposite sides of its transverse axis A—A. Then, as the movement of the dies progresses, the bottom faces 17 contact the sleeve and exert pressure thereon along the transverse axis. As a result, the metal in the sleeve flows about the inserted wires 10 and 11 so that an intimate contact is had about their entire peripheries. From the nature of the work pieces acted upon it is difficult to determine the exact flow of metal which takes place but apparently the initial contact between the dies at points displaced laterally from the transverse axis A—A first forces the metal into contact with the sides of the inserted wires and the subsequent contact of the bottom faces 17 then forces the sleeve into contact with the remainder of the wire peripheries.

The compression or sleeve deformation process described above requires a very heavy pressure to be exerted on the sleeve blank. Thus, when using a steel core or wire, it has been found desirable to utilize a pressure of approximately eighty thousand pounds per square inch and for aluminum, a pressure of approximately twenty thousand pounds per square inch. A pressure tool adapted to provide the necessary high pressures through manual manipulation is illustrated in my copending application Serial No. 136,151, filed April 10, 1937, patented April 5, 1938, Patent Number 2,113,087. In view of the high pressures required it is desirable to compress successive portions of the sleeve blank along its length rather than clamp the entire sleeve in a single operation. The length of such a portion relative to the length of the sleeve is indicated by the dimension "B" in Fig. 1. In addition, the ends of the sleeve blank are preferably left unconfined so that any excess metal is free to flow out of the ends of the dies longitudinally of the wires. With the arrangement described, a smooth joint is formed substantially free of side flashings. The joint is not only free from crevices or interstices in which corrosive gases or moisture may enter but is also extremely strong, having an ultimate tensile strength equal to or greater than that of the members joined.

I claim as my invention:

1. The method of splicing rod-like members which comprises, inserting the adjacent end portions of two cylindrical rod-like members into the opposite ends of a cylindrical metal sleeve, and pressing the inner wall of the sleeve into intimate contact with the surfaces of the rod-like members about their entire peripheries by deforming the cylindrical sleeve into a generally polygonal cross-sectional shape.

2. The method of forming a rigid frictional telescopic joint which comprises, inserting a portion of a cylindrical rod-like member within another member having a generally tubular shape, and applying pressure to the exterior of the tubular member at a plurality of points about its exterior surface to compress the same into a generally polygonal cross-sectional shape in tight gripping engagement with the rod-like member.

3. The method of forming a frictional joint between a portion of a cylindrical rod-like member inserted within a sleeve-like member having a cylindrical shape which comprises, applying pressure to the exterior of the sleeve-like member at a plurality of points about its exterior surface to compress the same into a generally polygonal cross-sectional shape, the maximum width of said polygonal cross section being substantially equal to the initial diameter of the sleeve-like member.

4. The method of forming a rigid frictional telescopic joint which comprises, inserting a portion of a cylindrical rod-like member within a cylindrical sleeve, and applying pressure in the direction of a transverse axis of the sleeve to the opposite sides thereof, said pressure being applied initially at points spaced laterally from said axis and subsequently along said axis to compress the sleeve into tight gripping engagement with the rod-like member.

5. The method of splicing rod-like members which comprises, inserting the adjacent end portions of two axially alined generally cylindrical rod-like members into the opposite ends of a cylindrical metal sleeve to bring such adjacent ends into abutment, and applying pressure to successive portions of the sleeve along its length to press the inner wall thereof into intimate contact with the surfaces of the rod-like members about their entire peripheries by deforming such successive portions of the cylindrical sleeve into a hexagonal cross-sectional shape while leaving the ends thereof unconfined.

6. A telescopic joint for rod-like members comprising, a ductile metal sleeve member telescoped over a cylindrical rod-like member and having the inner surface thereof in intimate contact with the entire periphery of the rod-like member, said sleeve having a polygonal cross section with the metal beneath each face of the polygon crushed inwardly toward said rod-like member.

7. A telescopic joint for rod-like members comprising, a ductile metal sleeve member telescoped over a cylindrical hod-like member and having the inner surface thereof in intimate contact with the entire periphery of the rod-like member, said sleeve having a hexagonal cross section with the metal beneath each face of the hexagon crushed inwardly toward said rod-like member from an initial cylindrical shape.

JOHN JENSEN.